United States Patent [19]
Barrett

[11] 4,234,833
[45] Nov. 18, 1980

[54] DOOR OPERATOR SYSTEM USING COUNTER CIRCUIT FOR DETERMINING LIMIT POSITIONS

[75] Inventor: Jack E. J. Barrett, Waupaca, Wis.

[73] Assignee: A. E. Moore Company, Inc., Waupaca, Wis.

[21] Appl. No.: 870,762

[22] Filed: Jan. 19, 1978

[51] Int. Cl.³ .............................................. G05D 3/20
[52] U.S. Cl. .................................. 318/282; 318/286; 318/468; 318/739
[58] Field of Search ............... 318/282, 286, 466, 468, 318/470, 603, 626, 739, 749, 778, 781, 256, 264, 265, 266, 640, 480

[56] References Cited

U.S. PATENT DOCUMENTS

| | | | |
|---|---|---|---|
| 3,427,518 | 2/1969 | Cloup | 318/603 |
| 3,571,685 | 4/1979 | Akins et al. | 318/603 |
| 3,891,909 | 6/1975 | Newson | 318/282 |
| 4,006,392 | 2/1977 | Catlett et al. | 318/266 |
| 4,035,705 | 7/1977 | Petterson et al. | 318/256 |

*Primary Examiner*—David Smith, Jr.
*Assistant Examiner*—M. K. Mutter
*Attorney, Agent, or Firm*—Emrich, Root, Lee, Brown & Hill

[57] ABSTRACT

The shaft driven by a reversible motor for opening and closing a door is provided with at least one reflective surface. An optical source/detector senses rotation of the shaft and generates a pulse each time one of the reflective surfaces passes. A programmable counter circuit counts the pulses in one direction when the door is opened and de-energizes the motor when a predetermined count is reached without the use of mechanical switches. The counter is decremented when the door is closed, and de-energizes the motor when the count returns to zero. Any obstruction will cause the system to stop the door if sensed during opening, or to reverse the door's direction if sensed during closing. Provision is made to account for any "coasting" the door may experience due to inertia; and the system will also track and permit small changes in the closed position of the door, as might occur if snow accumulates beneath the door.

12 Claims, 1 Drawing Figure

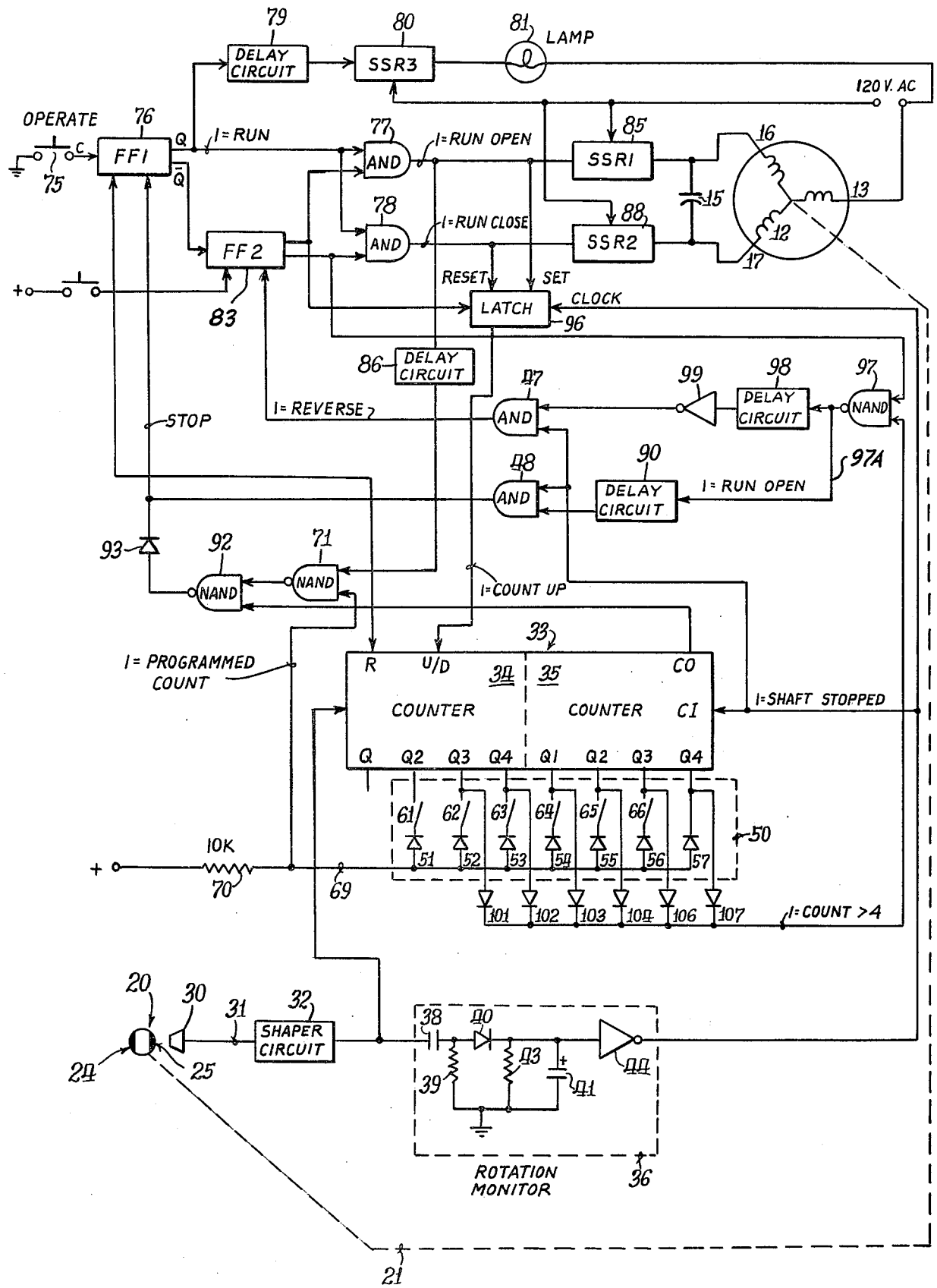

DOOR OPERATOR SYSTEM USING COUNTER CIRCUIT FOR DETERMINING LIMIT POSITIONS

BACKGROUND AND SUMMARY

The present invention relates to a system for opening and closing a door. When used in this sense, the word "door" is intended to have a broad meaning including any closure member, such as a residential or industrial garage door or gate.

In the past, door opening systems have relied heavily on the use of electromechanical limit switches to determine the "open" and "closed" position of the door for de-energizing the motor driving the door. Further, pressure switches or mechanical "trips" have been used to sense obstructions to movement of the door during opening or closing. One of the disadvantages of such prior system is that the limit switches had to be accurately installed for sensing the open and closed positions of the door. If the operation of these switches were in any way impaired or if they became dislodged from their original positions, the system would not operate as intended.

According to the present invention, the shaft driven by a reversible motor used for opening and closing the door is provided with at least one reflective surface. An optical source/detector is used to generate a train of pulses representative of the rotation of the drive shaft. These pulses are fed into a programmable counter circuit which is incremented for each pulse when the door is opened. When the counter circuit reaches a predetermined count, the motor is de-energized.

The counter circuit is programmable so that it also may count down, and when the operate push button is pushed a second time, the counter circuit is decremented by the pulses from the optical detector representative of rotations of the drive shaft. When the counter reaches a zero count, the door has been returned to its original position, and the motor is again de-energized.

A slip clutch is provided between the motor and drive shaft, so that if an obstruction is encountered by the door and it stops, the clutch will slip. A rotation monitor circuit generates a signal when the door is obstructed, and if the door was being opened when the obstruction was encountered, the motor is simply de-energized to stop the door. On the other hand, if the door was being closed, the rotation monitor reverses the motor and the door is opened.

The counter circuit may be programmed to detect any predetermined number of counts; and the open and closed positions of the door may therefore be accurately determined, depending upon the pitch of the thread cut in the drive shaft, and the number of reflective areas around the circumference of the shaft.

The system also provides a "park" cycle in which, if the operate button is actuated during opening or closing of the door, the drive motor is de-energized and the door is stopped. The next time the push button is actuated, the movement of the door will be reversed until it completes a full open or close cycle, or until the operate push button initiates another "park" cycle. The system also includes timing circuitry for operating an electric light as long as the drive motor is energized, and for a predetermined time after it is de-energized.

The system also includes circuitry for detecting and compensating for mechanical drift or coast due to inertia or other external forces. Additional circuitry permits the system to stop and reset if an obstruction is encountered within the last two inches of the original closed position setting.

Other features and advantages of the present invention will be apparent to persons skilled in the art from the following detailed description of a preferred embodiment accompanied by the attached drawing.

THE DRAWING

The drawing is a schematic diagram, partly in functional block form, of a system incorporating the present invention.

DETAILED DESCRIPTION

Referring to the drawing, reference numeral 10 generally designates an electric motor of the type commonly referred to as a "permanent split capacitor" motor. These motors are characterized as being instantly reversible, and they are in common use in air conditioners and blowers. The motor 10 includes a forward winding 11 and a reverse winding 12. One terminal of a conventional 120 v. alternating current source is connected to a terminal 13 of the motor; and a permanent split capacitor generally designated 15 is connected between the forward terminal 16 and the reverse terminal 17.

The motor 10 drives a shaft generally designated by reference numeral 20, and associated with the motor 10 by means of a dash line 21. A slip-type clutch is interposed between the motor 10 and the shaft 20 so that the shaft may be stopped without harming the motor.

The shaft 20, in the case of a garage door operator, is elongated and provided with a conventional screw thread. The pitch of the thread may typically be one inch, so that for every rotation of the screw, a nut would be moved one inch axially on the shaft. The nut may conventionally be attached to a trolley adapted for movement along a channel. A sectional overhead garage door is connected to the trolley by means of a conventional door arm so that the door is opened or closed depending upon the direction of rotation of the shaft 20. In the present invention, the shaft 20 is provided with first and second reflective surfaces 24, 25.

Reflective transducer means generally designated by reference numeral 30 cooperate with the reflective surfaces 24, 25 (which preferably are parabolic surfaces) to produce an electrical pulse on a line 31 every one-half revolution of the shaft 20. The reflective transducer 30 may include a source of light (either visible or infrared) directed toward the shaft 20, together with a phototransistor which is caused to conduct each time the source is reflected off one of the surfaces 24, 25 and caused to impinge on the phototransistor. The output of the phototransistor is coupled to the line 31 which is fed to the input of a pulse shaper circuit 32. The pulse shaper 32 may be a conventional Schmitt trigger circuit which generates output pulses representative of the number of revolutions of the shaft 20. In the illustrated embodiment, each pulse represents one-half revolution of the shaft 10, which in turn represents a distance of door travel of one-half inch.

The output signal of the pulse shaper is fed to the clock input of a counter circuit generally designated 33 and comprised of two four-bit counter circuits 34, 35, connected in series to provide an eight-bit counter. The output of the shaper 32 is also fed to the input of a rotation monitor circuit which is enclosed within the dashed block 36, seen at the bottom of the drawing.

The rotation monitor circuit includes a capacitor 38 and resistor 39 which differentiate incoming pulses. The differentiated signals are coupled through a diode 40 to a capacitor 41, and build up a charge on the capacitor 41, which is dissipated through a resistor 43. As long as the shaft 20 continues to rotate, there will be a charge on capacitor 41. An inverter circuit 44 generates a positive or "high" signal when the charge on capacitor 41 has dissipated, indicating that the shaft 20 has ceased rotation. This might occur because the door has reached a limit position, but more importantly, the rotation monitor circuit 36 generates an output signal if the door encounters an obstruction so that the shaft 20 stops rotation, whereas the motor slips by virtue of the slip clutch mentioned above. The output signal of the inverter circuit 44 is fed to first and second AND gates 47, 48, and it is used as an "enable" signal, to be discussed. The output signal of the rotation monitor 36 is also connected to the "carry in" input (labeled "CI") of the counter 33 and serves as a "counter enable" signal. The individual counter circuits 34, 35 each have four outputs, labeled Q1–Q4 respectively. The counters are commercially available as RCA part No. CD4516BE.

Program switch means, enclosed within the dashed block 50 include seven diodes designated 51–57 and six single-pole, single-throw switches, designated 61–66 respectively. The switches are connected in series respectively with the diodes, as illustrated, and each switch is connected to an associated output of the counter circuits 34, 35. The anodes of the diodes 51–57 are connected ted to a common line or terminal 69 which, in turn, is connected to a positive voltage supply via a resistor 70.

Selective ones of the switches 61–66 are closed in a combination which forms a binary representation of the number of half revolutions of the shaft 20 that are required to complete a full opening cycle of the door. In other words, when the counter circuit 33 has counted pulses sufficient to present the linear distance of the nut on the threaded shaft 20 to open the door, then the output signals of the counter will define a given binary number. If the corresponding switches are closed, the output signal on line 69 is a logic 1 or high. In other words, the switches 61–66 are used to program a binary number representative of the desired travel of the door, as measured by the half revolutions of the shaft 20 counted in the counter circuit 33 for the illustrated embodiment. If any of the outputs of the counter are low (i.e., a logic 0), then the signal on line 69 is a zero. When the output signals of the counter 33 are all high for those program switches which are closed, then the program switch means will generate a logic 1, which is coupled to a NAND gate 71. In summary, a 1 signal on the signal line 69 is representative of the counter's having counted a number of pulses sensed by the transducer 30 representative of revolutions of the shaft 20 equal to the predetermined number entered by the program switch circuitry 50.

Turning now to the upper left hand portion of the drawing, reference numeral 75 generally designates a push button called the "operate" push button, one terminal of which is grounded and the other terminal of which is fed to the clock input of a flip flop 76. A conventional rf operator may be substituted for the switch 75 for remote control, if desired. The push button 75 is used by an operator to open and close the door, as will be more fully explained below. The Q output of the flip flop 75 is fed to one input of an AND gate 77 and to one input of a second AND gate 78. The Q output of flip flop 76 is also fed through a delay circuit 79 to a solid state relay 80, which is used to energize a light bulb 81, which is located within the space enclosed by the door.

The $\overline{Q}$ output of the flip flop 76 is fed to the clock input of a second flip flop 83. Briefly, the function of the flip flop 76 may be thought of as determining whether the circuitry is operative or inactive, whereas the function of the flip flop 83 is to indicate, when the circuitry is operative, whether the door is to be driven in a first direction (which may be open) or a second direction (which may be close). The Q output of the flip flop 83 is connected to a second input of the AND gate 78. The $\overline{Q}$ output of flip flop 83 is connected to the second input of AND gate 77, as well as to the data input of a latch flip flop 96 which controls the counter circuit 33 to indicate whether the counter is to count up or to count down. If the $\overline{Q}$ signal is a 1, the counter circuit count increments; and if the signal is a 0, the counter circuit decrements, both incrementing and decrementing being responsive to pulses sensed by the transducer 30.

The Q output of the latch 96 is connected to the up/down input of counter 33 and is determined to be 1, or 0, by: (a) the "data" input of latch 96, at the time the output of the rotation monitor 36 goes to 1, (b) the logic level on the "set" input, or (c) the logic level on the reset input. The latch 96 locks the counter to the direction of shaft rotation (whether it be driven open or close) as long as the shaft is turning, whether it be driven or coasting. The set/reset inputs to latch 96 override the normal data/clock inputs to insure that the counter 33 is switched from down to up (as in the case of instant reverse) when the shaft 20 is reversed, without regard to normal latch 96 function.

The solid state relay 85, when it is caused to conduct by a 1 signal from AND gate 77, couples AC power to the terminal 16 of the motor 10 which is connected to the forward winding 11.

The output of AND gate 78 is connected to a solid state relay 88, the output of which is connected to the terminal 17 of the motor 10 and the reverse winding 12.

The output of AND gate 78 is also connected to the reset input of latch 96. The Q output of latch 96 is connected to the up/down input of counter 33. The output of AND gate 47 is connected to the reset input of flip flop 83. The output of AND gate 48 is also connected to the reset input of flip flop 76. The output of flip flop 83 is also connected to a NAND gate 97. The other input to NAND gate 97 is a line 97A which is connected through diodes 101–107 which are connected respectively to the six outputs of counter 33 of highest order. The signal on line 97A will be "1" as long as the accumulated count is greater than a binary "4". The output of NAND gate 97 is connected through a delay circuit 90 to AND gate 48 and through a delay circuit 98 and inverter 99 to AND gate 47. The delay of circuit 98 is preferably longer than that of circuit 90 because the former functions when the instant reverse mode is actuated during a close cycle.

The output of NAND gate 71 is connected to one input of a second NAND gate 92. The other input of NAND gate 92 is connected from the "carry out" output of the counter 33, which carries a logical 1 signal whenever the counter has a count greater than zero and generates a logical 0 signal whenever the counter contains a zero count. The output of NAND gate 92 is connected through a diode 93 to the reset input of the flip flop 76.

The set input of both flip flops 76 and 83 are connected in common to a reset push button generally designated 95, the other terminal of which is connected to a positive set voltage. The reset push button is also connected to the reset terminals of the counter circuit 33. When the reset push button is actuated, both flip flops 76 and 83 are set (that is, their Q outputs have a 1 signal on them), and the counter circuit is reset to a zero count.

OPERATION

Assuming that the door is closed, flip flop 76 is in the reset condition, that is, its Q output is zero. Flip flop 83 is in the reset condition with its Q output 1. The Q output of latch 96 is 1, causing counters 34, 35 to be programmed to count up, or increment, in response to any pulses from shaper circuit 32. When the operator presses the operate button 75, the flip flop 76 changes state and a 1 is sent to AND gate 77. The $\overline{Q}$ output of flip flop 83 already is a 1, so solid state relay 85 conducts, causing the motor 10 to be driven in the forward direction. At the same time, a signal is sent through delay circuit 79 to solid state relay 80 to energize light 81. The delay circuit 79 is a "delay off" circuit, and this delay may be approximately two minutes, as is done with conventional garage door operators. As the motor 10 is driven, the shaft 20 will rotate and cause pulses to be sensed by the transducer 30.

The output signal of AND gate 77 is also fed through delay circuit 86 to NAND gate 71. The function of delay circuit 86 is to permit the motor to get up to speed so that the transducer 30 begins to sense pulses and the rotation monitor circuit 36 will be operative. When the door reaches its open position, as determined by the count defined by the program switch means 50, a logical 1 is generated on the line 60 and fed to NAND gate 71. With both inputs to NAND gate 71 being 1, the output goes to 0. The other input of the NAND gate 92 had been a 1, so when the output of NAND gate 71 goes to 0, the output of NAND gate 92 goes to 1, thereby resetting flip flop 76. The $\overline{Q}$ output of flip flop 76 will go to 1, causing flip flop 83 to change state so that its Q output will be 1, and its $\overline{Q}$ output will be 0. The signal, when coupled to the "D" (i.e. data) input of latch 96, will be transferred to the counter 33 at the time the rotation monitor 36 output goes to 1, thereby programming the counter 33 to decrement the next time pulses are received from transducer 30. If, on the other hand, during opening of the door, the door had encountered an obstruction, the charge on capacitor 41 would dissipate because no pulses would be sensed by the transducer 30 (the shaft having been stopped and the clutch slipping). When the charge on capacitor 41 dissipates, the output of inverter circuit 44 goes to 1, and with both inputs of AND gate 48 being 1, the flip flop 76 resets immediately. This causes its Q output to be 0, and $\overline{Q}$ goes to 1. Flip flop 83 will reverse state and its Q output will be 1. With both inputs to AND gate 77 "0", the motor 10 will be de-energized. As will be discussed further below, if the obstruction is encountered when the door is being closed, the motor 10 is reversed, but if the obstruction is encountered when the door is being opened, as discussed here, the motor is simply turned off.

Assuming now that the door is open, and it is desired to close the door, the operate button 75 is again actuated, causing the Q output to become a 1. During this cycle of operation, AND gate 78 is enabled because the Q output of flip flop 83 is a 1. When both inputs to NAND gate 97 are 1's, AND gate 47 will be enabled through delay 98 and inverter 99. When the contents of the counter are decremented to zero, the "carry out" output of the counter (labeled "CO") generates a zero output which is coupled to the NAND gate 92. Since the line 69 has a 0 signal, the output of NAND gate 71 is a zero, and with two zeros input to the NAND gate 92, the output becomes a 1, and the flip flop 76 is reset. Flip flop 83 will again change state as the $\overline{Q}$ output of flip flop 76 goes to 1. This sets up AND gate 77 to enable solid state relay 85 the next time the operate push button 75 is actuated.

During the close cycle of operation, if an obstruction had been encountered, the output of the rotation monitor circuit 36 becomes a 1, thereby coupling a signal through AND gate 47 to reset flip flop 83. This causes the Q output of flip flop 83 to become a 1, thereby enabling AND gate 77, which causes solid state relay 85 to conduct and thereby instantly reverse the direction of the motor 10. At the same time, the reset input of latch 96 will go to 0 and the set input will go to 1, which will be transferred immediately to counter 33 causing it to reverse instantly from "count down" to "count up" and operation proceeds as discussed above for a complete opening of the door.

Referring particularly to NAND gate 97 and the circuitry responsive to its output, the $\overline{Q}$ output of flip flop 83 tells the circuitry whether the system is being run in a close cycle or an open cycle. If the $\overline{Q}$ output is a "0", the system is running in a close cycle; and if it is a "1", the system is running in an open cycle. The circuitry feeding AND gate 47, when actuated, causes the system to reverse instantly if the system is being run in a close cycle; whereas the AND gate 48 causes the system to stop if the system is being run in an open cycle. This operation just described is modified if the count signal from the diodes 101-107 is less than four. Assuming that the system is running in a close cycle (that is, the door is being returned to its close position), and the signal on line 97A is a "1", then the operation is as described. When the door approaches the close position within a space defined by the number of half revolutions less than the number defined by the diodes 101-107, then the signal on line 97A goes to "0", and the operation of the circuitry changes from an instant reverse to a stop enable function. That is, during the last four half revolutions of the shaft 20 for the illustrated embodiment, the output signal of NAND gate 97 enables the AND gate 48, rather than the AND gate 47; and this permits actuation of the flip flop 76, rather than the flip flop 83, when the rotation monitor circuit ceases to generate pulses. The function of this circuitry is to enable the system to track small changes in the close position of the door, and to permit a complete stop rather than an instant reverse should an obstruction be encountered during the last few half revolutions of the shaft, or, as persons skilled in the art will readily appreciate, any predetermined number of half revolutions. Thus, this circuitry permits the system to function as intended even though small changes in the close position might occur. For example, an obstruction might be on the floor preventing complete closure.

While the door is moving in either the open or close direction, the operate button 75 may be pressed to "park" the door. When this switch is actuated, the flip flop 76 will change state thereby disabling AND gates 77 and 78. When the flip flop 76 is reset, the Q output clocks flip flop 83 to its complementary state. It will be appreciated that the flip flop 76 determines whether the motor is energized (when its $\overline{Q}$ output is "1") or de-energized, whereas the flip flop 83 determines whether the motor is operated in an open cycle (when its Q output is "1") or a close cycle. The next time the operate button 75 is actuated, the flip flop 76 will be switched to its complementary state so that its Q output will be 1, and the motor will be energized, but because the flip flop 83 had been clocked, the motor will be operated in a reverse direction. The operate button 75 may again be operated to initiate another park cycle, if desired.

Referring now to the latch flip flop 96, it permits the system to track the actual position of the door during an open cycle or during a park cycle by counting the actual revolutions of the shaft 20 so that the exact number is used in returning the door to its desired position. For example, if the system is running in an open cycle and the operate push button 75 is actuated to park the door, the AND gates 77, 78 are disabled; and the $\overline{Q}$ output of flip flop 76 clocks the flip flop 83 to reverse its state. However, the new information output from flip flop 83 is not fed to the programmed count input of the counter 33 until the output signal of the rotation monitor circuit goes from 0 to 1, since it is this signal which is used to clock the data input in the latch 96 to the counter 33. This operation prevails whether the park mode is initiated during a close cycle or an open cycle. The delay enables the counter 33 to count the actual number of half revolutions of the shaft 20, and accounts for inertia of the door. On the other hand, if an obstruction is encountered during a close cycle, then the output of AND gate 47 goes to a 1 instantly, causing the $\overline{Q}$ output of flip flop 83 to become a 1. The output of AND gate 77 also becomes a 1, and this sets the latch 96 immediately, reversing the direction of count of the counter 33, irrespective of the output of the rotation monitor 36.

The reset push button 95 is used on initial set up and programming of the system, or to reset the system if power is interrupted while the unit is undergoing an open or a close cycle. By pressing and holding the push button 95, both flip flops 76 and 83 are caused to be set, and AND gate 78 will be enabled, thereby causing the motor 10 to drive the door toward close. When the door is closed, by releasing the reset button, flip flop 76 will be reset by AND gate 92, and the contents of the counter 33 will be zero because the reset push button is also coupled to the reset inputs of the counter circuits. Hence, the motor will stop and the counter will be set to zero. Further, when the rotation monitor 36 generates a 1 signal, it is coupled through AND gate 47 to reset flip flop 83. The next time the push button 75 is actuated, an open cycle will be initiated. The circuitry is said to be in a standby state when the flip flop 76 is reset because the system is awaiting the next actuation of the operate push button 75.

As already indicated, any time flip flop 76 generates a 1 on its Q output causing the motor to energize, the light 81 is also energized, and it will stay energized for a predetermined time delay of approximately two minutes, and this delay is reinitiated for a complete cycle each time the delay circuit 79 is actuated.

Having thus disclosed in detail a preferred embodiment of the invention, persons skilled in the art will be able to modify certain of the structure which has been illustrated and to substitute equivalent elements for those disclosed while continuing to practice the principle of the invention; and it is, therefore, intended that all such modifications and substitutions be covered as they are embraced within the spirit and scope of the appended claims.

I claim:

1. Apparatus for opening and closing a door comprising: a reversible electric motor coupled to a drive shaft; transducer means operatively associated with said shaft for generating signals representative of rotations of said shaft; counter circuit means receiving the signals from said transducer means for generating a count signal when the rotations of said shaft reach a predetermined number, actuatable switch means; binary circuit means responsive to actuation of said switch means for generating output signals defining a plurality of states including an open cycle, a close cycle and at least one stop state; first logic circuit means responsive to the output signals of said binary circuit means for selectively operating said motor in a first direction and a second direction when said binary circuit means is in said open and close cycles respectively to thereby drive said shaft to open and close said door, said first logic circuit means being further responsive to the output signals of said binary circuit means for de-energizing said motor when said binary circuit means is in said stop state; second logic circuit means for switching said binary circuit means from said open cycle to a stop state when said binary circuit means is in said open cycle and said counter circuit means generates said count signal to thereby de-energize said motor when said shaft has turned a predetermined number of revolutions; and rotation monitor circuit means responsive to the output signals of said transducer means for generating a signal when the rotation of said shaft stops; said second logic circuit means being responsive to the output signal of said rotation monitor circuit means and an output signal of said binary circuit means representative of the operation of said system in said close cycle to switch said binary circuit means to said open cycle and thereby reverse the direction of said motor when said shaft stops due to an obstruction during a close cycle, said second logic circuit means being further responsive to the output signal of said rotation monitor circuit means and an output signal of said binary circuit means representative of the operation of said system in an open cycle to change the state of said binary circuit means to cause said motor to stop; and detector means responsive to the output of said counter circuit means indicative of said door's being within a predetermined number of counts from a full closed position to modify the operation of said second logic circuit means during a close cycle to permit said binary circuit means to cause said motor to stop during said predetermined count rather than to reverse in direction if an obstruction is encountered as said door approaches the fully closed position.

2. The apparatus of claim 1 wherein said counter circuit means further generates a ZERO signal when its contents are zero, said second logic circuit means further switching said binary circuit means from said close cycle to a stop state when said binary circuit means in said close cycle and said counter circuit means generates said zero signal to thereby de-energize said motor when said shaft has reversed for said predetermined number of revolutions.

3. The apparatus of claim 2 wherein said counter circuit means counts up to said predetermined number in response to a signal from said binary circuit means, and decrements to zero in response to the complement of said signal from said binary circuit means.

4. The apparatus of claim 1 wherein said drive shaft is equipped with a slip clutch; said system further comprising rotation monitor circuit means for generating an output signal when said transducer means indicates that said shaft has stopped rotating; and said first logic circuit means being responsive to the output signal of said rotation monitor circuit means for switching said binary circuit means to a stop state if said binary circuit means is in one of said open and close cycles and said rotation monitor circuit means determines that said shaft has stopped rotating.

5. The apparatus of claim 4 further comprising reset circuit means including an actuatable switch for forcing said binary circuit means to said close cycle and for resetting the contents of said counter circuit means to zero when said reset circuit means is actuated.

6. The apparatus of claim 4 wherein said binary circuit means is switched to a stop state if said push button is actuated when said binary circuit means is in one of said open and close cycles, to thereby define a park cycle.

7. The apparatus of claim 6 wherein said binary circuit means is responsive to the successive actuation of said first switch means to switch said binary circuit means from said open state to said standby state and then to said close state.

8. The apparatus of claim 6 wherein said binary circuit means is responsive to successive actuations of said first actuatable switch means to switch said binary circuit means from said state directly to said open state.

9. The apparatus of claim 1 further comprising delay circuit means responsive to said binary circuit means being either in said open state or said close state for actuating a light circuit for as long as the binary circuit means is in one of said states and for a predetermined time thereafter.

10. The apparatus of claim 9 wherein said instant reverse circuit means is actuated when said system is run in a close cycle, said system further comprising decoder circuit means responsive to the output signals of said counter circuit means for disabling said instant reverse circuitry when said door approaches its closed position within a predetermined amount, as determined by said counter circuit means, and for enabling said system to go to a stop state when an obstruction is encountered, whereby said system is permitted to adjust to minor obstructions in the way of a complete closing of said door.

11. The apparatus of claim 3 further comprising latch circuit means having its output signal determine whether said counter circuit means increments or decrements, said latch circuit means including a data input received from said binary circuit means indicative of whether said system is in an open or a close cycle, said latch circuit means including a clock signal derived from said rotation monitor circuit whereby the data input is clocked to said counter circuit means only when said rotation monitor circuit indicates that said shaft has stopped, whereby when said binary circuit means is switched to a stop state, said system is permitted to track said door and account for any overrun thereof due to inertia.

12. The apparatus of claim 10 wherein said latch circuit means further includes a set input for instantly switching the output states thereof irrespective of said clock input signal when said system switches from a close cycle to an open cycle, thereby permitting said system to reverse instantly if an obstruction is encountered during the close cycle.

* * * * *

UNITED STATES PATENT AND TRADEMARK OFFICE
CERTIFICATE OF CORRECTION

PATENT NO. : 4,234,833
DATED : November 18, 1980
INVENTOR(S) : Jack E. J. Barrett It is certified that error appears in the above—identified patent and that said Letters Patent is hereby corrected as shown below:

Column 9, line 5, after "clutch" insert a period -- . -- lines 5-14, cancel "; said system further comprising...stopped rotating.".

*Signed and Sealed this*

*Seventh* Day of *April 1981*

[SEAL]

*Attest:*

RENE D. TEGTMEYER

*Attesting Officer*     *Acting Commissioner of Patents and Trademarks*